(12) United States Patent
Bown

(10) Patent No.: US 6,956,491 B2
(45) Date of Patent: *Oct. 18, 2005

(54) MONITORING BEARING PERFORMANCE

(75) Inventor: David C. Bown, Northborough, MA (US)

(73) Assignee: GSI Lumonics Corporation, Billerica, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 10/461,982

(22) Filed: Jun. 13, 2003

(65) Prior Publication Data

US 2004/0090339 A1 May 13, 2004

Related U.S. Application Data

(63) Continuation of application No. 09/883,680, filed on Jun. 18, 2001, now Pat. No. 6,593,854.

(60) Provisional application No. 60/211,921, filed on Jun. 16, 2000.

(51) Int. Cl.[7] .............................................. G08B 21/00
(52) U.S. Cl. ...................... 340/682; 340/506; 340/514; 340/515; 340/679; 340/683
(58) Field of Search ................................ 340/682, 506, 340/514, 515, 679, 683; 310/90.5, 90; 250/231.16, 250/231.17; 324/662; 342/442, 424; 700/279

(56) References Cited

U.S. PATENT DOCUMENTS

| | | |
|---|---|---|
| 4,237,454 A | 12/1980 | Meyer |
| 4,326,677 A | 4/1982 | Schippers et al. |
| 4,406,169 A | 9/1983 | Ikeuchi et al. |
| 4,493,042 A | 1/1985 | Shima et al. |
| 4,665,393 A | 5/1987 | Wilder et al. |
| 5,140,849 A | 8/1992 | Fujita et al. |
| 5,221,933 A | 6/1993 | Chandler et al. |
| 5,226,736 A | 7/1993 | Becker et al. |
| 5,381,692 A | 1/1995 | Winslow et al. |
| 5,602,437 A | 2/1997 | Shahamat et al. |
| 5,875,066 A | 2/1999 | Ottesen |
| 6,191,513 B1 | 2/2001 | Chen et al. |
| 6,262,860 B1 | 7/2001 | Ishida |
| 6,593,854 B2 * | 7/2003 | Brown ....................... 340/682 |

OTHER PUBLICATIONS

PCT International Search Report dated Dec. 6, 2001 of International Application No. PCT/US01/19496 filed Jun. 18, 2001.

* cited by examiner

*Primary Examiner*—Daryl C Pope
(74) *Attorney, Agent, or Firm*—Maine & Asmus

(57) ABSTRACT

Techniques for qualifying and monitoring bearing performance and condition in a rotary servo systems (e.g., galvanometer scanner) are disclosed. A position error signal is analyzed for signal anomalies that can signify bearing damage. A DC offset ramp is applied to the position error signal to test whether the anomaly is angular position dependent. The anomaly is associated with the corresponding command signal value and range of values to calculate the angular position and range of the apparent bearing damage. The amplitude of the anomaly is measured and associated with a relative degree of bearing damage.

20 Claims, 3 Drawing Sheets

MONITORING BEARING PERFORMANCE

RELATED APPLICATIONS

This application is a continuation of U.S. application Ser. No. 09/883,680, filed Jun. 18, 2001, now U.S. Pat. No. 6,593,854 which claims the benefit of U.S. Provisional Application No. 60/211,921, filed Jun. 16, 2000. Each of these applications is herein incorporated in its entirety by reference.

FIELD OF THE INVENTION

The present invention relates to the monitoring of galvanometer bearing performance, and more particularly to analyzing the response to position commands for information about bearing condition.

BACKGROUND OF THE INVENTION

One of the fundamental operating components of galvanometer systems are bearings. Bearings and the peripheral components allow the high speed and precision operation of scanners and similar devices.

However, bearings are subject to stress and damage from the physical contact and environmental conditions. As the bearings begin to wear or develop divots, the tolerance of the entire system degrades. Other causes for degradation includes the bearing interface with the race assembly. Due to the degrading performance, eventually the system falls out of tolerance and requires maintenance. In some situations, bearing failure can shut down a critical manufacturing line or other high priority operation. Parts and personnel may not be at beckon call to repair the system.

In addition, due to the precise manufacturing requirements, the bearings may suffer from design problems or manufacturing defects that do not comply with the system requirements. Such errors require a means to detect and quantify the error in order to notify the manufacturer and maintain the high quality of the product.

There have been some attempts to alleviate the aforementioned problems. In U.S. Pat. No. 4,326,677, a monitoring circuit for detecting metallic contact between the high-speed spindle and the housing is disclosed. Such a condition alerts personnel to this condition to avoid more serious problems. Another monitoring circuit is shown in U.S. Pat. No. 5,226,736, wherein sensors measure the dimensions of cracks or pits in the race or between the race and rings. The data is communicated to the processing center that analyzes the data for fault conditions.

What is needed is a means of detecting bearing tolerance changes over time. Such a system would be able to detect variations in the operating performance of a galvanometer bearing set and alert operators to potential problems. Such a monitoring and detection system must be simple and cost-effective to use and operate, and be passively transparent such that it does not interfere with normal operation of the galvanometer device or system. One of the advantages of such a system would be to incorporate a tolerance margin that could be used by maintenance personnel to anticipate failures in advance, so that the necessary replacement or repair parts would be in stock and the unit scheduled for down-time and service prior to an actual failure.

BRIEF SUMMARY OF THE INVENTION

One embodiment of the present invention provides a method of monitoring bearing performance in a rotary servo system. The method includes generating a position error signal based on a comparison of a command signal and a corresponding actual position signal, and measuring anomaly amplitude included in the position error signal. In response to a measured anomaly amplitude exceeding a preset threshold, the method further includes indicating a system fault.

Indicating a system fault includes, for example, at least one of alerting maintenance personnel, triggering pre-programmed self-correction using operating parameters of the servo system, shutting down the servo system, and indicating a likelihood of bearing damage. The method may include the preliminary steps of applying a command signal for position change to the servo system, and generating an actual position signal for the servo system.

The method may further include correlating measured anomaly amplitude to a degree of bearing damage. The method may further include equating each measured anomaly amplitude exceeding the preset threshold with one or more angular positions of likely bearing damage. The method may further include testing amplitude anomalies for angular position dependence. In one such embodiment, indicating a system fault includes indicating positional dependence. In another such embodiment, testing amplitude anomalies for angular position dependence includes applying an offset voltage ramp to the position error signal so as to distinguish mechanically induced anomalies from electrical anomalies.

Another embodiment of the present invention provides a rotary servo system configured for monitoring bearing performance. The system includes a position error signal generator that is adapted to generate a position error signal based on a comparison of a command signal and a corresponding actual position signal. In addition, a controller is adapted to measure anomaly amplitude included in the position error signal, thereby enabling real-time monitoring of bearing condition. In response to a measured anomaly amplitude exceeding a preset threshold, the controller can be further adapted to indicate a system fault. In one such embodiment, the controller is operatively coupled to a servo drive unit and an angular position sensor. The rotary servo system can be, for example, a galvanometer scanner.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate the elements describe, and in which.

DETAILED DESCRIPTION OF THE INVENTION

The graphs illustrated are not to scale, but the information conveyed in the figures and description will be readily understood by those skilled in the art.

Figure 1:
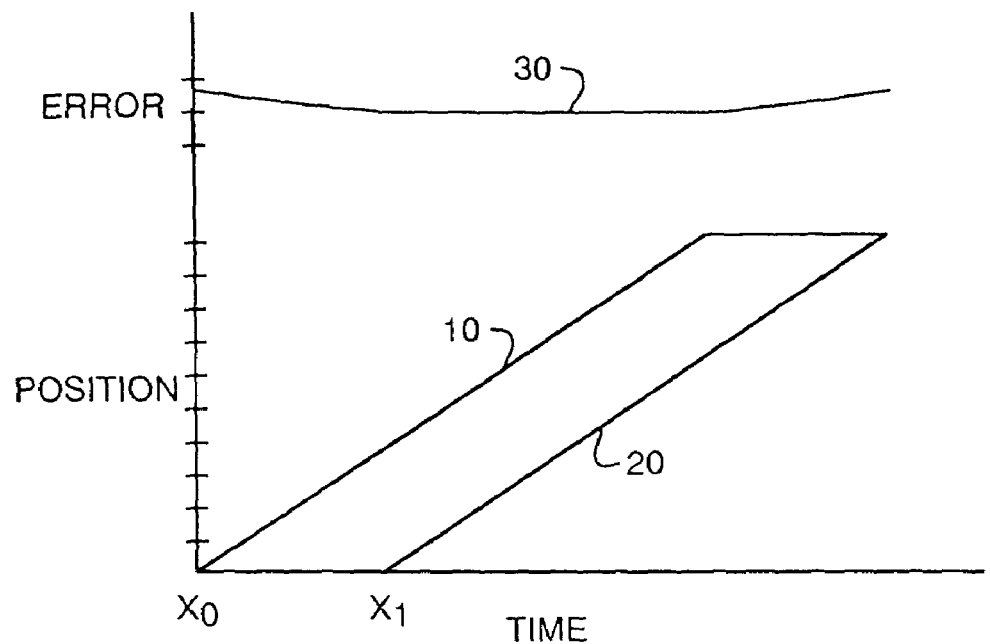
FIG. 1 shows a linear command signal, and ideal position signal and position error signals.

In FIG. 1, the ideal position/time command signal 10 and position signal 20 of a rotary servo system are illustrated. The ideal command signal 10 is a linear ramp starting at $t_0$, commanding a constant velocity movement or position change across the angular range of the device. The ideal position signal 20, neglecting lag time, is also a linear ramp commencing at $t_1$. The difference between $t_1$ and $t_0$ is the lag or delay time that occurs between when the command signal is issued and when the system responds. The ideal position error signal 30, a ramp from $t_0$ to $t_1$ representing the accumulating lag time of response, is after $t_1$ a horizontal line representing the constant lag time value with no error or noise in the ideal signals.

Figure 2:
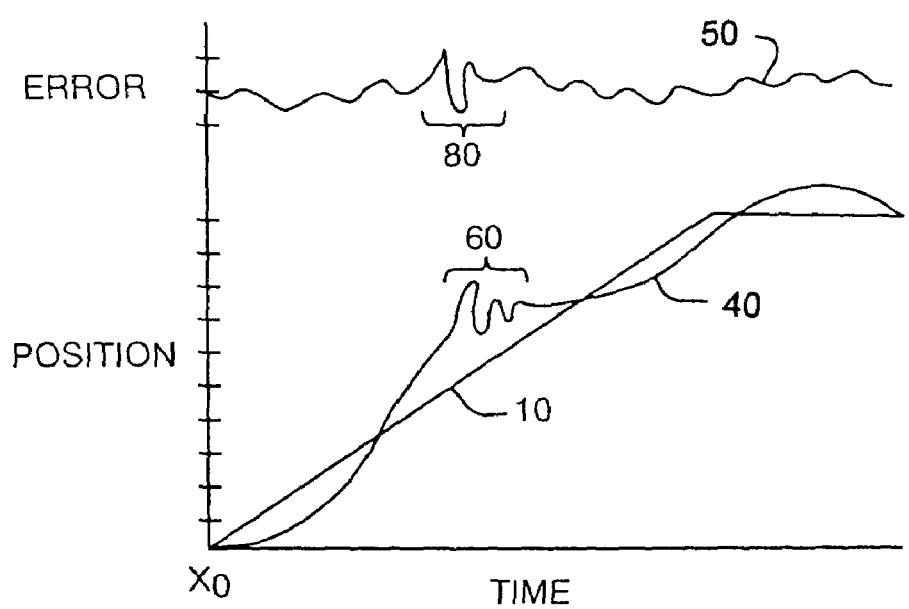
FIG. 2 illustrates a more practical representation of a command signal, position signal and position error signal, with an anomaly occurring in the position error signal.

A more realistic depiction of the signals is shown in FIG. 2. The command signal is still a linear ramp 10, but the non-ideal position signal 40 now shows an oscillation or irregular curvature in its response, representative of the inevitable deviations in rotary servo devices from the ideal. The non-ideal position error signal 50 has some amplitude that represents some noise components. The noise is typically attributable to roughness in the bearings or races, properties of the lubricants and similar mechanical sources. However it is also possible that the source of contamination is electrical in nature, such as white noise. A large change 60 in the position signal 40 would also represent a significant change 80 in the position error signal 50, whether the change was the result of a divot in the bearing or some electrical noise error.

Figure 3:
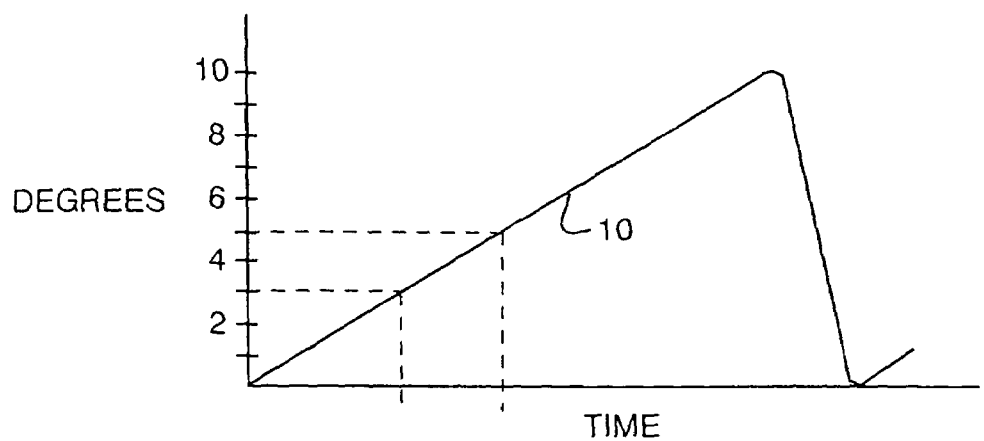
FIG. 3 illustrates the angular range of the servo device associated with the command signal angular position range.

Referring to FIG. 3, and looking only at the command signal 10 in relation to the position error signal 50. The command signal 10 is a representation of the commanded range of the shaft rotation, such as from 0 to 10 degrees of rotation. In the typical scanner operation the scanner rotation is generally limited to a small range of degrees, with the shaft continually tracking the command signal within those few degrees.

Figure 4:
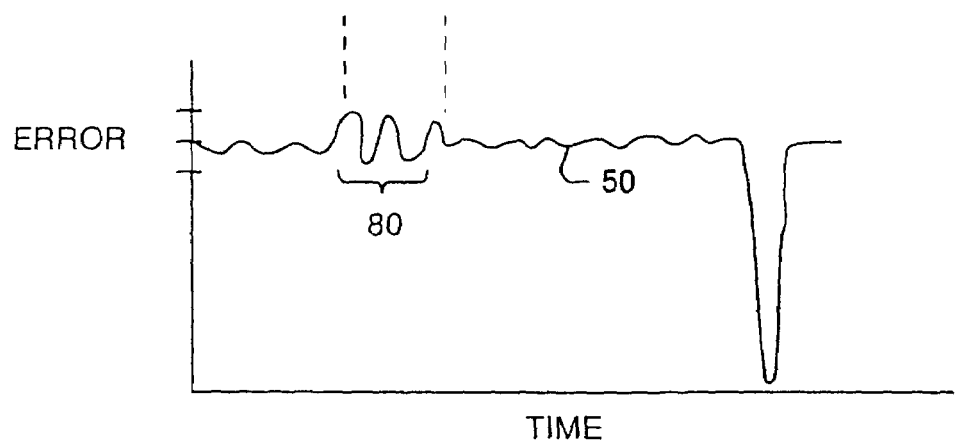
FIG. 4 shows the position error signal with its anomaly being associated with related angular position values of the command signal of FIG. 3.

As shown in FIG. 4, the perturbation or anomaly apparent at region 80 of position error signal 50 occurs at some associated angular position of the command signal 10. Because the position error signal 50 is a difference signal, it is possible to amplify the signal and obtain more accurate measurements of the anomaly with respect to the associated angular position of the command signal as well as of the amplitude of the anomaly.

In this example, anomaly 80 in the position error signal 50 occurred between 3 and 5 degrees of the angular command. This large change can be analyzed and processed to determine several attributes of anomaly 80.

The amplitude of the anomaly can be directly correlated to the amount or degree of bearing damage. A very large amplitude that is outside of acceptable thresholds will alert maintenance personnel or may be used to trigger pre-programmed self-correction steps within the operating parameters of the servo system including self shutdown.

The subset of command position signal range over which the anomaly occurs represents the angular extent of the damaged region. In this example, the width of the damage extends 2 degrees across the face of the bearing contact surface.

However, anomaly 80 might also be attributable to a source of electrical signal or noise contamination unrelated to the exact angular position of the servo shaft and bearings, so it is necessary to distinguish between mechanically induced and mechanically unrelated electrical errors. In accordance with the invention, this is accomplished by applying a DC offset voltage ramp to the position error signal 50 and noting its effect on the timing of the anomaly within the position error signal 50.

Figure 5:
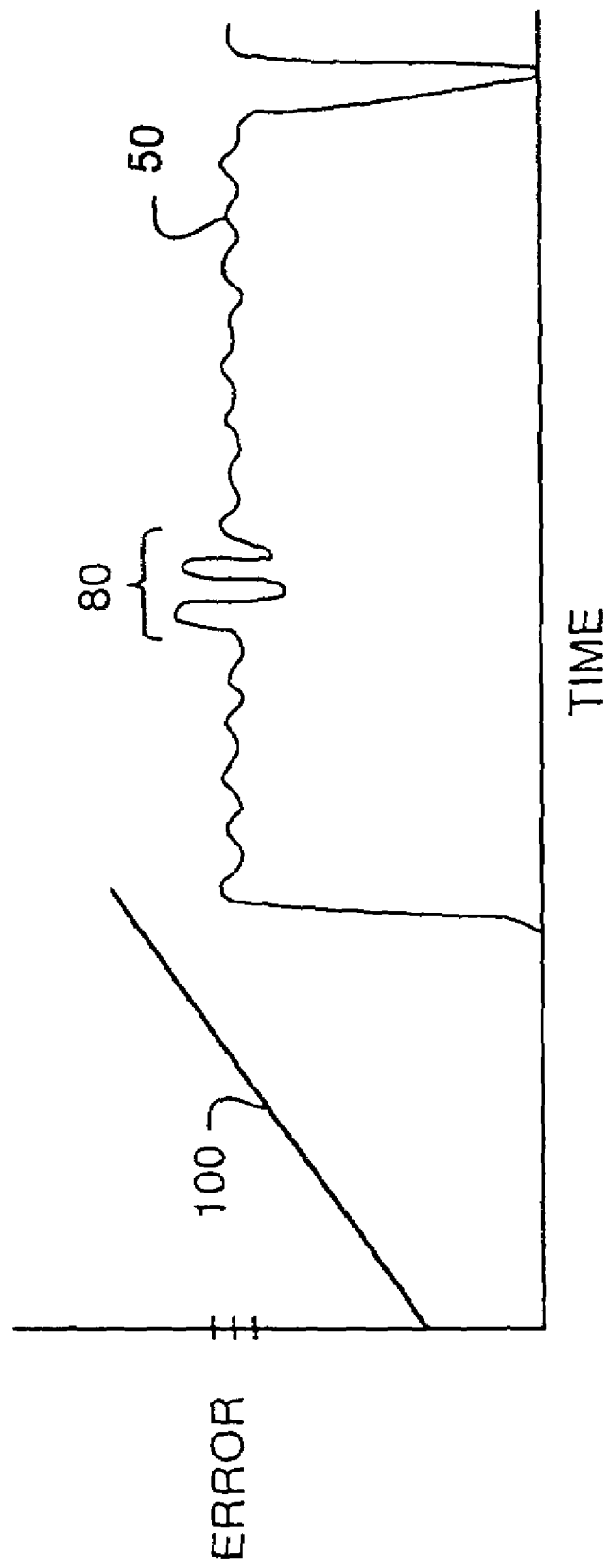
FIG. 5 illustrates the application of a DC offset ramp signal and its effect on a position error signal.

As shown in FIG. 5, a DC offset ramp signal 100 is applied to the position error signal 50, which causes the position error signal 50 to be shifted or offset in time. Thus, anomaly 80 will also be offset in time, shifting with the position error signal 50, if it is attributable to a mechanical problem as opposed to an unrelated electrical problem. In other words, DC offset ramp 100 can be used to test anomaly 80 for being related to the angular position of the shaft, rather than a positionally unrelated source.

In light of the figures and description of the preferred embodiment, other embodiments within the scope of the claimed invention will be readily apparent to those skilled in the art.

For example, there is a method of monitoring bearing performance in other rotary servo devices, which includes applying a command signal for position change to the servo device, generating an actual position signal by use of an angular position sensor, comparing the command signal and the position signal, and from that generating a position error signal. The position error signal is then evaluated for anomalies in amplitude not apparent in the balance of the signal, that would suggest something out of the ordinary is occurring at that angular position. The anomaly is measured in amplitude and tested for angular position dependence in the manner described. If it is position dependent, the amplitude is equated according to a pre-determined table based on prior analysis, to an amount or degree of apparent bearing damage.

The method may include associating the occurrence of each anomaly with a relative nominal value of command signal to command signal range in angular terms, for example an occurrence appearing at two degrees into a ten degree available range of angular motion, for calculating the angular position of bearing damage. Expanding on this aspect of the invention, the angular range of the bearing damage is similarly calculable by more closely inspecting the duration of the anomaly to ascertain the associated upper and lower limits of the command signal and range of the limits relative to the full command signal range.

The method may include actuating a system fault signal when the amount of bearing damage exceeds a preset threshold amount, for either manual or automatic response which may include maintenance warnings or even system shutdown. The testing for angular position dependence can be done by applying an offset voltage ramp signal to the position error signal generator, and observing whether the anomaly is shifted with respect to its position within the position error signal. If it is, then the anomaly is angular position dependent, and more likely associated with bearing damage. Finally, the method may be employed using an angular position command controller incorporated into the device or connected to its servo drive unit and angular position sensor.

As another example, consistent with the above descriptions, the rotary servo device can be a galvanometer scanner to which the same methodology is applied in order to qualify and monitor scanner bearing performance and condition. The method may employ the scan controller and enablement of a position sensor and position error signal generator.

These and other examples are embodied in the claims that follow, consistent with the specification and figures provided.

What is claimed is:

1. A method of monitoring bearing performance in a rotary servo system, comprising:
   generating a position error signal based on a comparison of a command signal and a corresponding actual position signal;
   measuring anomaly amplitude included in the position error signal; and
   in response to a measured anomaly amplitude exceeding a preset threshold, indicating a system fault.

2. The method of claim 1 wherein indicating a system fault includes alerting maintenance personnel.

3. The method of claim 1 wherein indicating a system fault includes triggering pre-programmed self-correction using operating parameters of the servo system.

4. The method of claim 1 wherein indicating a system fault includes shutting down the servo system.

5. The method of claim 1 wherein indicating a system fault includes indicating a likelihood of bearing damage.

6. The method of claim 1 further comprising:
   correlating measured anomaly amplitude to a degree of bearing damage.

7. The method of claim 1 further comprising:
   testing amplitude anomalies for angular position dependence.

8. The method of claim 7 wherein indicating a system fault includes indicating positional dependence.

9. The method of claim 7 wherein testing amplitude anomalies for angular position dependence includes:
   applying an offset voltage ramp to the position error signal so as to distinguish mechanically induced anomalies from electrical anomalies.

10. The method of claim 1 further comprising:
    equating each measured anomaly amplitude exceeding the preset threshold with one or more angular positions of likely bearing damage.

11. A method of monitoring bearing performance in a rotary servo system, comprising:
    applying a command signal for position change to the servo system;
    generating an actual position signal for the servo system;
    generating a position error signal based on a comparison of the command signal and the actual position signal;
    measuring anomaly amplitude included in the position error signal; and
    in response to a measured anomaly amplitude exceeding a preset threshold, indicating a system fault.

12. The method of claim 11 wherein indicating a system fault includes at least one of alerting maintenance personnel, triggering pre-programmed self-correction using operating parameters of the servo system, shutting down the servo system, and indicating a likelihood of bearing damage.

13. The method of claim 11 further comprising:
    testing amplitude anomalies for angular position dependence.

14. The method of claim 13 wherein indicating a system fault includes indicating positional dependence.

15. The method of claim 13 wherein testing amplitude anomalies for angular position dependence includes:
    applying an offset voltage ramp to the position error signal so as to distinguish mechanically induced anomalies from electrical anomalies.

16. The method of claim 11 further comprising:
    equating each measured anomaly amplitude exceeding the preset threshold with one or more angular positions of likely bearing damage.

17. A rotary servo system configured for monitoring bearing performance, the system comprising:
    a position error signal generator adapted to generate a position error signal based on a comparison of a command signal and a corresponding actual position signal; and
    a controller adapted to measure anomaly amplitude included in the position error signal, thereby enabling real-time monitoring of bearing condition.

18. The system of claim 17 wherein in response to a measured anomaly amplitude exceeding a preset threshold, the controller is further adapted to indicate a system fault.

19. The system of claim 17 wherein the controller is operatively coupled to a servo drive unit and an angular position sensor.

20. The system of claim 17 wherein the rotary servo system is a galvanometer scanner.

* * * * *

UNITED STATES PATENT AND TRADEMARK OFFICE
CERTIFICATE OF CORRECTION

PATENT NO. : 6,956,491 B2
DATED : October 18, 2005
INVENTOR(S) : David C. Brown

It is certified that error appears in the above-identified patent and that said Letters Patent is hereby corrected as shown below:

Title page,
Item [75], Inventor, delete "Bown", insert -- Brown --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,956,491 B2
DATED : October 18, 2005
INVENTOR(S) : David C. Brown

It is certified that error appears in the above-identified patent and that said Letters Patent is hereby corrected as shown below:

Title page,
Item [75], Inventor, delete "Bown", insert -- Brown --.

Signed and Sealed this

Tenth Day of January, 2006

JON W. DUDAS
*Director of the United States Patent and Trademark Office*